US012769228B2

(12) United States Patent
Ishikawa et al.

(10) Patent No.: US 12,769,228 B2
(45) Date of Patent: Oct. 20, 2026

(54) LIQUID-DISCHARGE CONTAINER WITH LOTUS-EFFECT SURFACE STRUCTURE

(71) Applicant: CANON KABUSHIKI KAISHA, Tokyo (JP)

(72) Inventors: Hideki Ishikawa, Kanagawa (JP); Akira Suzuki, Kanagawa (JP); Shunsuke Kuboyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/025,549

(22) Filed: Jan. 16, 2025

(65) Prior Publication Data

US 2025/0155835 A1 May 15, 2025

Related U.S. Application Data

(63) Continuation of application No. PCT/JP2023/026486, filed on Jul. 20, 2023.

(30) Foreign Application Priority Data

Jul. 27, 2022 (JP) ................................ 2022-119547
Jul. 3, 2023 (JP) ................................ 2023-109524

(51) Int. Cl.
*G03G 15/08* (2006.01)
*B29C 45/37* (2006.01)
*B65D 1/02* (2006.01)

(52) U.S. Cl.
CPC ......... *G03G 15/0867* (2013.01); *B29C 45/37* (2013.01); *B65D 1/02* (2013.01)

(58) Field of Classification Search
CPC ..... G03G 15/0867; B29B 11/08; B29C 45/17; B29C 45/37; B29C 49/06; B29C 49/30; B65D 1/02
See application file for complete search history.

(56) References Cited

U.S. PATENT DOCUMENTS

2020/0297152 A1* 9/2020 Kuempel ................ A47J 31/02
2021/0223714 A1 7/2021 Kibayashi
2023/0407969 A1* 12/2023 Sugiyama ................ G02B 1/18

FOREIGN PATENT DOCUMENTS

JP 2004361699 A 12/2004
JP 2013129455 A 7/2013
JP 2020160303 A 10/2020
JP 2021066139 A 4/2021
WO WO-2005070781 A2 * 8/2005 .......... B01L 3/50825

* cited by examiner

*Primary Examiner* — Sophia S Chen
(74) *Attorney, Agent, or Firm* — Canon U.S.A., Inc. IP Division

(57) ABSTRACT

When a direction passing through a port part and a bottom part is defined as a height direction, a width in a direction intersecting the height direction of a protruded part of a depression-protrusion structure at a certain position in the height direction is greater than a width in the direction intersecting the height direction of the protruded part of the depression-protrusion structure at a position on a bottom part side relative to the certain position in the height direction, or a width in the direction intersecting the height direction of a depressed part of the depression-protrusion structure at a certain position in the height direction is less than a width in the direction intersecting the height direction of the depressed part of the depression-protrusion structure at a position on the bottom part side relative to the certain position in the height direction.

21 Claims, 17 Drawing Sheets

LIQUID-DISCHARGE CONTAINER WITH LOTUS-EFFECT SURFACE STRUCTURE

CROSS-REFERENCE TO RELATED APPLICATIONS

This application is a Continuation of International Patent Application No. PCT/JP2023/026486, filed Jul. 20, 2023, which claims the benefit of Japanese Patent Applications No. 2022-119547, filed Jul. 27, 2022, and No. 2023-109524, filed Jul. 3, 2023, all of which are hereby incorporated by reference herein in their entirety.

BACKGROUND OF THE INVENTION

Field of the Invention

The present invention relates to a container.

Background Art

A container generally used is widely used to house liquid such as water and a chemical solution, a gel material, and the like. However, the liquid or the gel material (hereinafter, referred to as "liquid or the like") may remain on an inner wall of the container, and an amount of the liquid or the like that can be taken out of the container may be reduced from an actual amount of the housed liquid.

Patent Literature 1 discusses a configuration in which anti-dripping property of a plastic container is improved by providing fine protrusions, each having a height of 10 nm to 50 nm, on an inner surface of the container at a density of one position to an area of 10 square nm to 100 square nm.

CITATION LIST

Patent Literature

Patent Literature 1: Japanese Patent Application Laid-Open No. 2013-129455

In the configuration discussed in Patent Literature 1, study of motion of the liquid or the like when the liquid or the like is taken out of the container is not sufficient, and the liquid or the like may not be taken out well.

SUMMARY OF THE INVENTION

The present invention is directed to a container from which liquid or the like is easily taken out.

According to an aspect of the present invention, a container includes a port part, a barrel part continuous with the port part, a bottom part provided on a side opposite to the port part via the barrel part, and a depression-protrusion structure configured to develop a lotus effect on at least an inner surface of the barrel part, wherein, when a direction passing through the port part and the bottom part is defined as a height direction, a width in a direction intersecting the height direction of a protruded part of the depression-protrusion structure at a certain position in the height direction is greater than a width in the direction intersecting the height direction of the protruded part of the depression-protrusion structure at a position on a bottom part side relative to the certain position in the height direction, or a width in the direction intersecting the height direction of a depressed part of the depression-protrusion structure at a certain position in the height direction is less than a width in the direction intersecting the height direction of the depressed part of the depression-protrusion structure at a position on the bottom part side relative to the certain position in the height direction.

According to another aspect of the present invention, a container includes a port part, a barrel part continuous with the port part, a bottom part provided on a side opposite to the port part via the barrel part, and a depression-protrusion structure configured to develop a lotus effect on at least an inner surface of the barrel part, wherein, when a direction passing through the port part and the bottom part is defined as a height direction, a width in a direction intersecting the height direction of a protruded part of the depression-protrusion structure at a certain position in the height direction is less than a width in the direction intersecting the height direction of the protruded part of the depression-protrusion structure at a position on a bottom part side relative to the certain position in the height direction, or a width in the direction intersecting the height direction of a depressed part of the depression-protrusion structure at a certain position in the height direction is greater than a width in the direction intersecting the height direction of the depressed part of the depression-protrusion structure at a position on the bottom part side relative to the certain position in the height direction.

According to another aspect of the present invention, a container includes a port part, a barrel part continuous with the port part, a bottom part provided on a side opposite to the port part via the barrel part, and a depression-protrusion structure configured to develop a lotus effect on inner surfaces of the barrel part and the bottom part, wherein, when a direction passing through the port part and the bottom part is defined as a height direction, the depression-protrusion structure of the barrel part is configured to include, in a direction intersecting the height direction, a plurality of protruded parts or depressed parts arranged in a stripe pattern extending in the height direction, and the depression-protrusion structure of the bottom part is configured to include a plurality of protruded parts or depressed parts separate from one another arranged two-dimensionally.

According to another aspect of the present invention, a container includes a port part, a barrel part continuous with the port part, a bottom part provided on a side opposite to the port part via the barrel part, and a depression-protrusion structure configured to develop a lotus effect on at least an inner surface of the barrel part, wherein a width of a protruded part at a position on a port part side relative to a bottom part side of the depression-protrusion structure is different from a width of the protruded part at a position on the bottom part side relative to the port part side of the depression-protrusion structure, or a width of a depressed part at a position on the port part side relative to the bottom part side of the depression-protrusion structure is different from a width of the depressed part at a position on the bottom part side relative to the port part side of the depression-protrusion structure.

According to exemplary embodiments of the present invention, the liquid and the like can be easily taken out of the container.

Further features of the present invention will become apparent from the following description of exemplary embodiments with reference to the attached drawings.

DESCRIPTION OF THE EMBODIMENTS

Figure 1A:
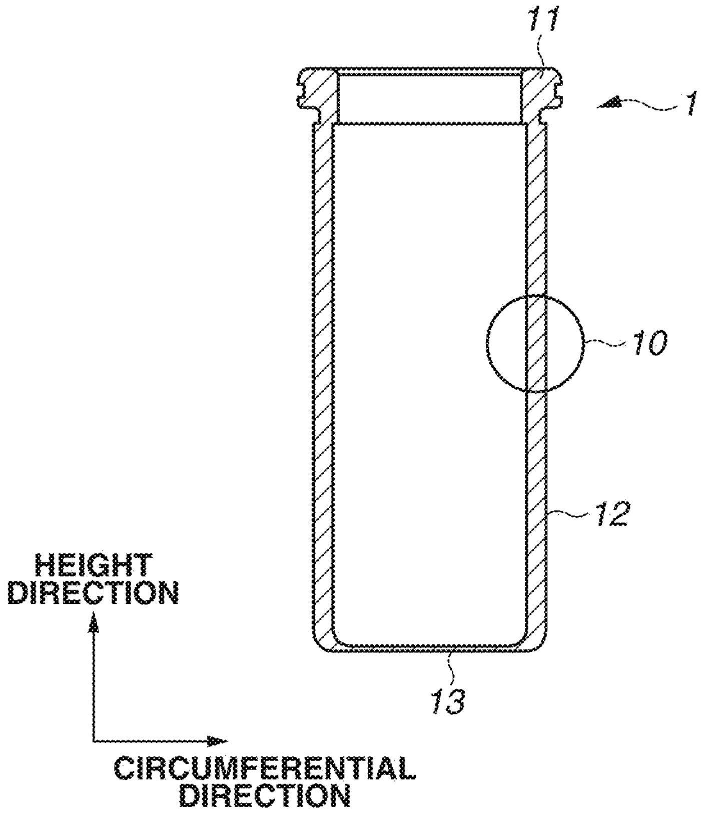
FIG. 1A is a diagram illustrating a container according to a first exemplary embodiment.

Some exemplary embodiments of the present invention are described below with reference to the drawings. Each of the exemplary embodiments described below is one exemplary embodiment of the invention, and the present invention is not limited thereto. A common component is described with mutual reference to the plurality of drawings, and descriptions of components denoted by a common reference numeral are appropriately omitted. Different items having the same name can be distinguished from each other by adding "n-th" to the items' name, such as a first item and a second item.

Figure 1B:
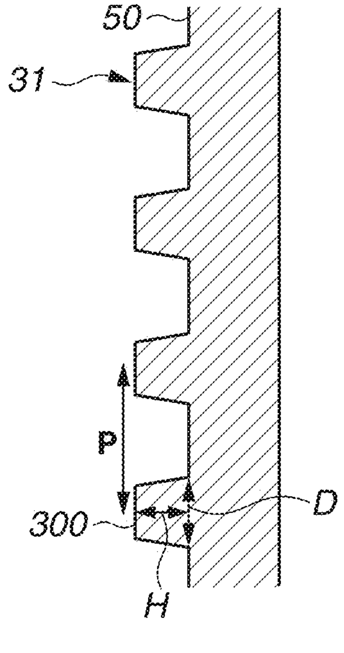
FIG. 1B is a diagram illustrating a configuration in which a plurality of protruded parts is provided on a base surface.

FIG. 1A is a diagram illustrating a container 1 according to a first exemplary embodiment, and FIG. 1B is an enlarged view of a part surrounded by a circle 10 in FIG. 1A.

The container 1 includes a port part 11, a barrel part 12 continuous with the port part 11, and a bottom part 13 provided on a side opposite to the port part 11 via the barrel part 12. As illustrated in FIG. 1B, a depression-protrusion structure 31 developing a lotus effect is provided on the barrel part 12. The depression-protrusion structure 31 is desirably provided not only on the barrel part 12 but also on the bottom part 13, but is desirably not provided on the port part 11 of the container 1. If the depression-protrusion structure is provided on the port part 11, the depression-protrusion structure may become an obstacle when liquid or the like is put in the container 1. In a case where the depression-protrusion structure is provided on the port part 11, in a process of molding the container, an inner surface of the container 1 may be damaged, or the depression-protrusion structure may be shaved and shavings may be generated in demolding.

In the present exemplary embodiment, as illustrated in FIG. 1A and FIG. 1B, a direction passing through the port part 11 and the bottom part 13 is defined as a height direction. Further, in the present exemplary embodiment, a direction intersecting the height direction is a direction along the inner surface of the container 1. In a case where the container 1 has a cylindrical shape such that a cross-section orthogonal to the height direction of the container 1 has a circular shape, the direction intersecting the height direction is a circumferential direction.

FIG. 1B illustrates a configuration in which a plurality of protruded parts is provided on a base surface 50. A height H of each of protruded parts 300 of the depression-protrusion structure 31 is desirably 1 μm or more and less than 100 μm. A width D in the height direction of each of the protruded parts 300 is defined as the largest width of each of the protruded parts 300 and is desirably 1 μm or more and 80 μm or less. A pitch P in the height direction of the depression-protrusion structure 31 is desirably 1 μm or more and 100 μm or less, and more desirably 1 μm or more and 70 μm or less. The pitch P indicates a distance between the center of a certain protruded part and the center of a protruded part adjacent to the certain protruded part. However, the height H and the width D of each of the protruded parts 300 and the pitch P of the depression-protrusion structure 31 are not limited to the above-described ranges as long as the depression-protrusion structure 31 has a shape developing the lotus effect.

While only the height and the width of each of the protruded parts provided on the base surface 50 are described herein, a plurality of depressed parts may be provided on the base surface 50, and a depth and a width of each of the depressed parts may be set to ranges similar to the above-described ranges. In a case where the depressed parts are provided on the base surface 50, the depth of each of the depressed parts is desirably within a range similar to that of the height of each of the protruded parts. Likewise, a width of each of the depressed parts is defined as the largest width of each of the depressed parts.

Figure 2:
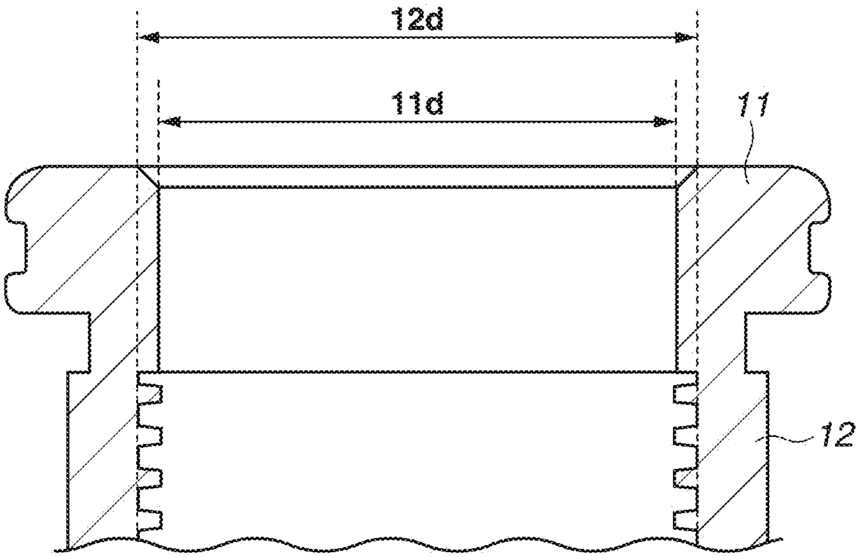
FIG. 2 is an enlarged view of a vicinity of a port part illustrated in FIG. 1A.

FIG. 2 is an enlarged view of a vicinity of the port part 11 illustrated in FIG. 1A. In the present exemplary embodiment, an opening width 11*d* (hereinafter, width 11*d*) of the port part 11 and a width 12*d* of the barrel part 12 of the container 1 are different from each other, and the width 12*d* of the barrel part 12 is greater than the width 11*d* of the port part 11. This makes it possible to increase a capacity of the container 1. Further, the depression-protrusion structure 31 is not shaved in a manufacturing process, and the container 1 having higher water repellency can be provided. The reason why the depression-protrusion structure is not shaved in the manufacturing process is described below. To increase the capacity of the container 1 and to prevent deformation of the depression-protrusion structure 31 in the manufacturing process, the width 12*d* of the barrel part 12 is desirably 1.005 times or more the width 11*d* of the port part 11, and is desirably 1.05 times or less the width 11*d* of the port part 11.

Figure 3A:
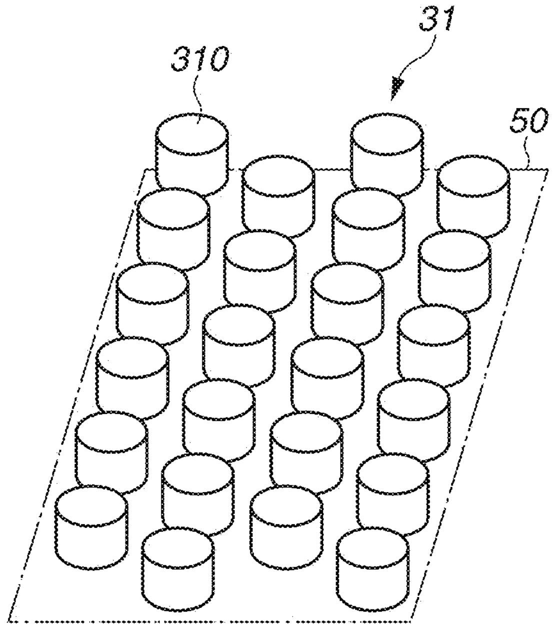
FIG. 3A is a diagram illustrating a shape of the protruded parts in a case where the plurality of protruded parts is provided on the base surface.
Figure 3B:
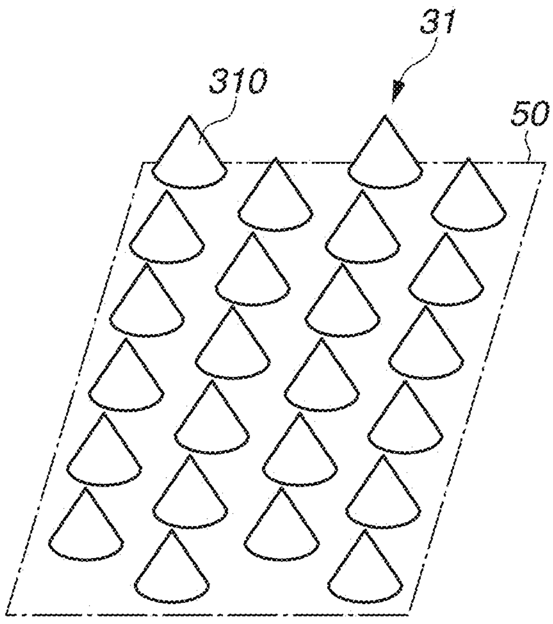
FIG. 3B is a diagram illustrating a shape of the protruded parts in the case where the plurality of protruded parts is provided on the base surface.
Figure 3C:
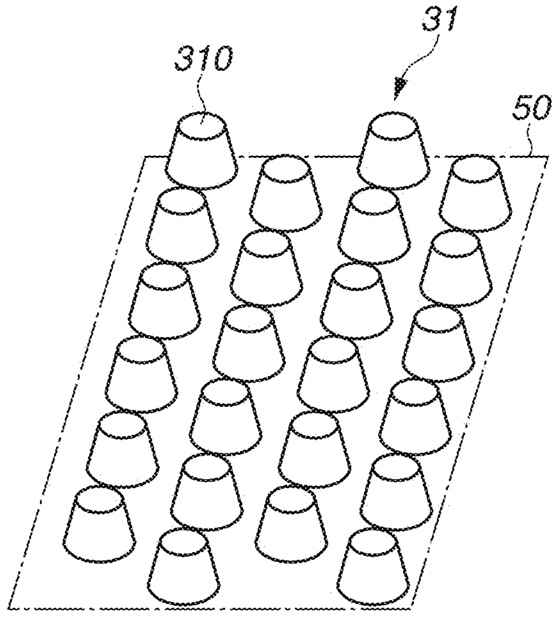
FIG. 3C is a diagram illustrating a shape of the protruded parts in the case where the plurality of protruded parts is provided on the base surface.

FIGS. 3A to 3C are diagrams each illustrating the shape of the protruded parts in the case where the plurality of protruded parts separate from one another is provided on the base surface 50. Protruded parts 310 can each selectively have a shape such as a columnar shape illustrated in FIG. 3A, a conical shape illustrated in FIG. 3B, and a truncated cone shape illustrated in FIG. 3C as long as the depression-protrusion structure 31 has a water repellent function. The container 1 according to the present exemplary embodiment is desirably made of a material containing a resin, but may be made of a material such as glass. As the resin, a thermoplastic material such as a cycloolefin polymer (COP), polystyrene, polycarbonate, polypropylene, and polyethylene (PE) can be used. The container 1 and the depression-protrusion structure 31 are desirably integrally formed. This makes it possible to provide the container 1 whose water repellency hardly deteriorates even when used for a long-time.

In place of the configuration in which the plurality of protruded parts separate from one another is provided on the base surface 50 as illustrated in FIGS. 3A to 3C, a configuration in which a plurality of depressed parts separate from one another is provided on the base surface 50 may be adopted. In this case, each of the depressed parts provided on the base surface 50 desirably has a shape obtained by inverting a columnar shape, a conical shape, or a truncated cone shape. In other words, a space surrounded by surfaces constituting one depressed part desirably has the columnar shape, the conical shape, or the truncated cone shape. In the present exemplary embodiment, the example in which each of the protruded parts 310 has a shape rotationally symmetric about a normal of the base surface 50 is described; however, each of the protruded parts 310 does not necessarily have the rotationally symmetric shape. For example, each of the protruded parts may have an asymmetric shape in which a cross-sectional shape along the height direction and a cross-sectional shape along the direction intersecting the height direction are different from each other. Likewise, in the case where the depressed parts are formed, each of the depressed parts may have an asymmetric shape.

FIGS. 3A to 3C each illustrate the configuration in which the protruded parts 310 separate from one another are arranged in a staggered pattern (in a honey-comb pattern). Alternatively, the protruded parts 310 may be arranged in a matrix. In other words, the present exemplary embodiment encompasses a configuration in which the plurality of protruded parts 310 separate from one another is two-dimensionally arranged. However, from a viewpoint of more densely arranging the protruded parts, the protruded parts are desirably arranged in a staggered pattern. In a case where the depressed parts separate from one another are two-dimensionally arranged, the depressed parts are desirably arranged in a staggered pattern as in the case of the protruded parts.

The shape of each of the protruded parts in the height direction is described above. In the configurations illustrated in FIGS. 3A to 3C, a width in the direction intersecting the height direction of each of the protruded parts 310 is desirably 1 μm or more and 80 μm or less. The width of each of the protruded parts is defined as the largest width of each of the protruded parts. The pitch in the direction intersecting the height direction of the protruded parts 310 is desirably 1 μm or more and 100 μm or less, and more desirably 1 μm or more and 70 μm or less. In the case where the protruded parts 310 are arranged in a matrix, the pitch in the direction intersecting the height direction is a pitch in a row direction. On the other hand, in the case where the protruded parts 310 are arranged in a staggered pattern, the pitch is defined as a length (distance) between corresponding parts of the protruded parts 310 adjacent to each other. In the case where the protruded parts 310 are arranged in a staggered pattern, the protruded parts 310 are desirably arranged such that the pitch of the protruded parts 310 is the same as viewed from all directions parallel to the base surface 50. In the present exemplary embodiment, the pitch in the case where the pitch of the protruded parts 310 is the same is also referred to as the pitch in the direction intersecting the height direction. In the case where the depressed parts are provided on the base surface 50, the width and the pitch in the direction intersecting the height direction are similar to those of the protruded parts.

Figure 4A:
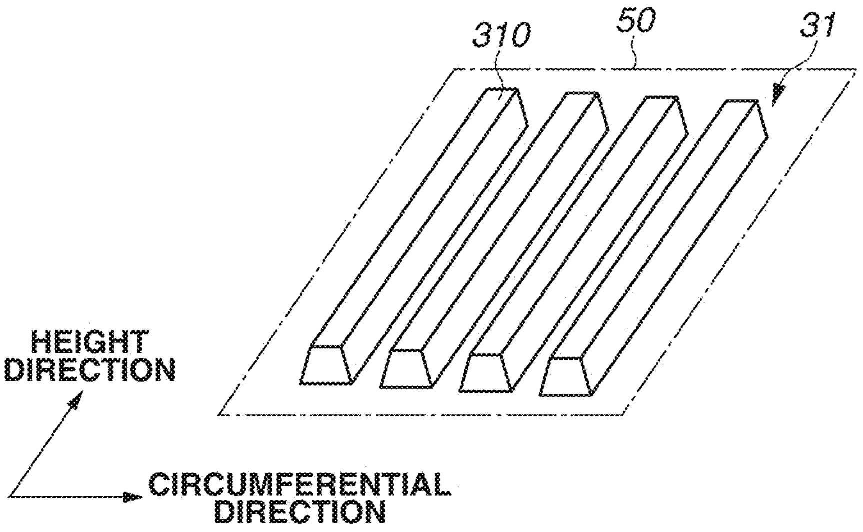
FIG. 4A is a diagram illustrating arrangement of the protruded parts provided on the base surface.
Figure 4B:
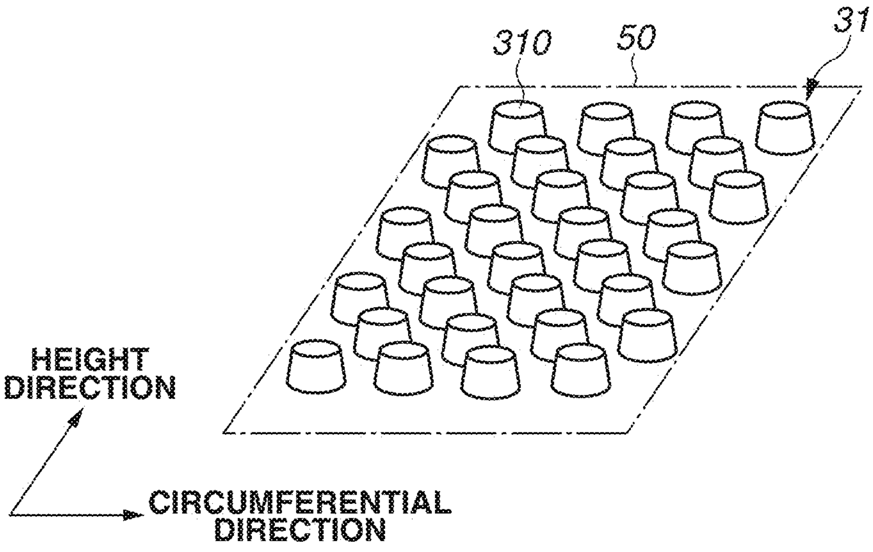
FIG. 4B is a diagram illustrating arrangement of the protruded parts provided on the base surface.

FIGS. 4A and 4B are diagrams each illustrating arrangement of the protruded parts provided on the base surface 50. FIG. 4A illustrates a case where the plurality of protruded parts is arranged in a stripe pattern, and FIG. 4B illustrates the case where the plurality of protruded parts is arranged in a staggered pattern. In the case where the protruded parts 310 are arranged in a stripe pattern as illustrated in FIG. 4A, the protruded parts 310 are formed to extend in the height direction, which is the direction passing through the port part 11 and the bottom part 13 of the container 1. In other words, the plurality of protruded parts 310 is formed to be arranged side by side in the direction (circumferential direction) intersecting the height direction of the container 1. When the protruded parts 310 are arranged in a stripe pattern, liquid or the like can be efficiently discharged. In the case where the protruded parts 310 are formed in a stripe pattern as described above, the height of each of the protruded parts 310 is desirably 1 μm or more and less than 100 μm. The width in the direction intersecting the height direction of each of the protruded parts 310 arranged in a stripe pattern is desirably 1 μm or more and 80 μm or less. The width in the direction intersecting the height direction is defined as the largest width of each of the protruded parts in the height direction (in a thickness direction of the container). The pitch in the direction intersecting the height direction of the protruded parts 310 arranged in a stripe pattern is desirably 1 μm or more and 100 μm or less, and more desirably 1 μm or more and 70 μm or less.

The plurality of depressed parts arranged in a stripe pattern extending in the height direction may be provided on the base surface 50. In this case, the plurality of depressed parts is arranged side by side in the direction intersecting the height direction. The depth of each of the depressed parts is desirably 1 μm or more and less than 100 μm. The width in the direction intersecting the height direction of each of the depressed parts arranged in a stripe pattern is desirably 1 μm or more and 80 μm or less. The width in the direction intersecting the height direction is defined as the largest width of each of the depressed parts in a depth direction (in a thickness direction of the container). The pitch in the direction intersecting the height direction of the depressed parts arranged in a stripe pattern is desirably 1 μm or more and 100 μm or less, and more desirably 1 μm or more and 70 μm or less.

In the case where the plurality of protruded parts 310 separate from one another is arranged, the arrangement is not limited to a staggered arrangement (honey-comb arrangement) illustrated in FIG. 4B, and various arrangements such as a matrix arrangement (lattice arrangement) described above may be adopted. In other words, in the case where the protruded parts 310 are two-dimensionally arranged, the arrangement may be any arrangement as long as the depression-protrusion structure 31 develops the lotus effect. In the case where the plurality of depressed parts is provided on the base surface 50, the depressed parts are desirably arranged in a stripe pattern, or two-dimensionally arranged (including a staggered arrangement and a matrix arrangement).

Figure 5A:
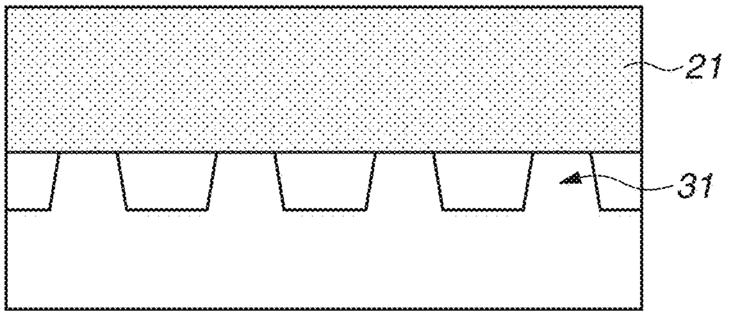
FIG. 5A is a diagram illustrating a water repellent effect by a depression-protrusion structure.
Figure 5B:
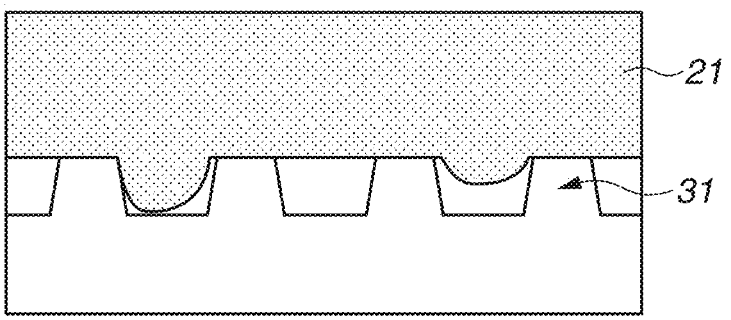
FIG. 5B is a diagram illustrating the water repellent effect by the depression-protrusion structure.

FIGS. 5A and 5B are diagrams each illustrating a water repellent effect by the depression-protrusion structure 31. FIG. 5A illustrates a state where an air layer is formed in a region sandwiched by the plurality of protruded parts, and a liquid 21 is supported. In contrast, FIG. 5B illustrates a state where no air layer is formed in the region sandwiched by the plurality of protruded parts, and the liquid 21 infiltrates into a space between the plurality of protruded parts. To form the air layer between the plurality of protruded parts, it is necessary to increase an apparent contact angle θ generated by surface tension of the liquid.

Figure 6:
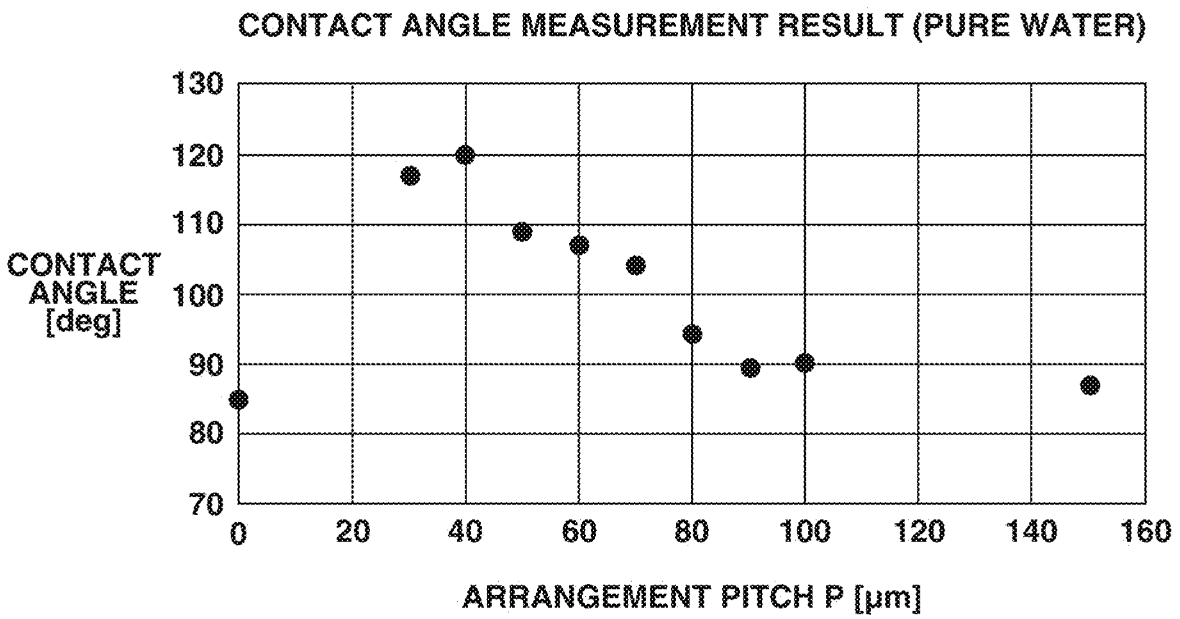
FIG. 6 is a graph illustrating a relationship between a pitch and a contact angle.

FIG. 6 is a graph illustrating a relationship between the pitch P and the contact angle θ when the plurality of protruded parts each having a truncated cone shape and a height of 30 μm is arranged as illustrated in FIG. 4B, and pure water is put in the container. In the graph, a case where the pitch P is zero indicates a case where the depression-protrusion structure 31 is not provided. It is evident that the contact angle θ becomes small as the pitch P is increased. In particular, when the pitch P is 150 μm, the contact angle θ is almost the same as in the case where the depression-protrusion structure is not provided. On the other hand, it is evident that when the pitch P is reduced from 100 μm, the contact angle θ reaches 120 degrees at the pitch P of 40 μm. The contact angle θ is desirably 90 degrees or more, and more desirably 100 degrees or more. Therefore, as described above, the pitch P is desirably 100 μm or less, and more desirably 70 μm or less.

The case is described above where each of the protruded parts of the depression-protrusion structure 31 has the fixed width in the direction intersecting the height direction. However, in a case of a container from which contents such as liquid are taken out from the port part 11, the container is desirably configured such that the width in the direction intersecting the height direction of each of the protruded parts is increased from the bottom part 13 toward the port part 11. Such an example is described with reference to FIGS. 7A and 7B and FIGS. 8A and 8B. In the following description, the container 1 having a cylindrical shape (in which the cross-section in the direction intersecting the height direction has a circular shape) is used as an example. Thus, the direction intersecting the height direction is referred to as the circumferential direction. However, the shape of the container 1 is not limited to the cylindrical shape. In such a case, the direction intersecting the height direction can be defined as a direction that intersects the height direction and extends along the inner surface (base surface) of the container. For example, in a case where the inner surface of the container 1 includes flat surfaces intersecting each other, the direction intersecting the height direction can be rephrased as a direction that intersects the height direction and is parallel to the inner surface (base surface) of the container.

Figure 7A:
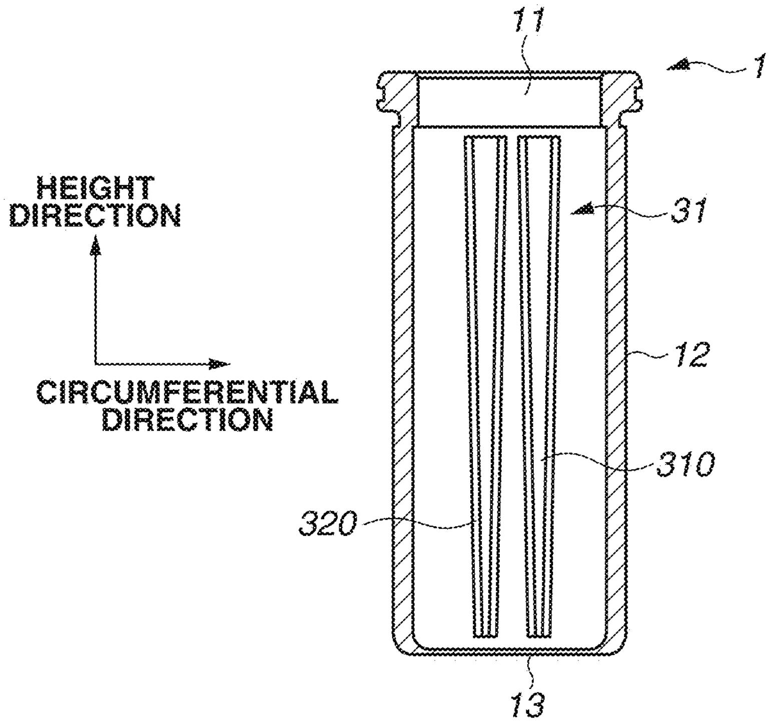
FIG. 7A is a schematic diagram illustrating a configuration in which the protruded parts of the depression-protrusion structure are arranged in a stripe pattern.
Figure 7B:
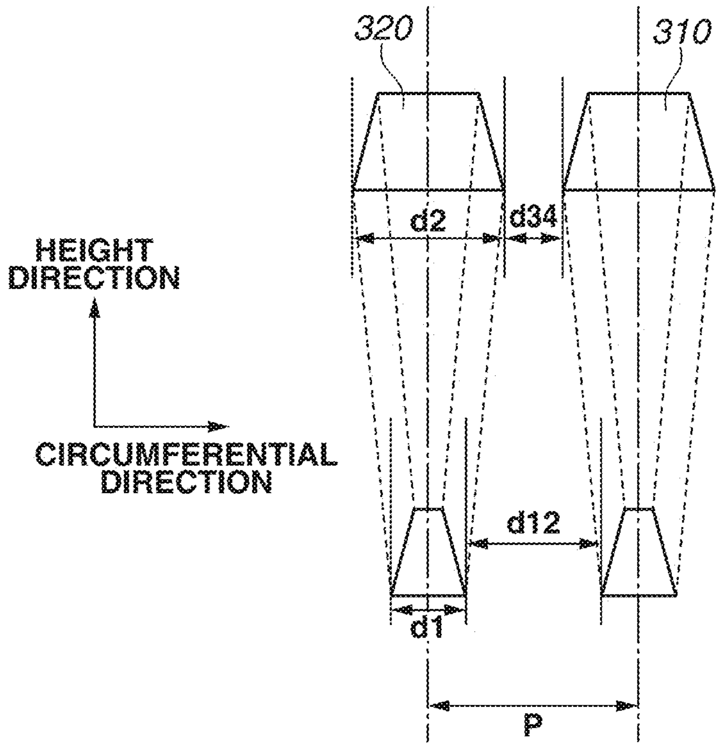
FIG. 7B is an enlarged view illustrating cross-sectional shapes of a first protruded part and a second protruded part illustrated in FIG. 7A.

FIG. 7A is a schematic diagram illustrating a configuration in which the protruded parts of the depression-protrusion structure 31 are arranged in a stripe pattern. In FIG. 7A, only a first protruded part 310 and a second protruded part 320 are illustrated; however, the plurality of protruded parts is desirably arranged over an entire inner peripheral surface of the barrel part 12 of the container 1. FIG. 7B is an enlarged view illustrating cross-sectional shapes of the first protruded part 310 and the second protruded part 320 illustrated in FIG. 7A.

In the exemplary embodiment illustrated in FIG. 7A, widths of the first protruded part 310 and the second protruded part 320 in the direction (circumferential direction) intersecting the height direction gradually increase from the bottom part 13 toward the port part 11. In FIG. 7A, the widths of the protruded parts in the circumferential direction are continuously changed, but the widths need not necessarily be continuously changed. For example, the width in the circumferential direction of each of the protruded parts may be the same in a certain part. In other words, it is sufficient for the protruded part to have a configuration in which a width d2 in the direction intersecting the height direction of the protruded part at a certain position in the height direction is greater than a width d1 in the direction intersecting the height direction of the protruded part at a position on a bottom part side relative to the certain position in the height direction.

As illustrated in FIG. 7B, a distance between the first protruded part 310 and the second protruded part 320 is desirably reduced from the bottom part 13 toward the port part 11. In other words, a distance d12 between the first protruded part 310 and the second protruded part 320 on the bottom part 13 side is desirably greater than a distance d34 between the first protruded part 310 and the second protruded part 320 on the port part 11 side. In the case where the pitch P of the protruded parts is fixed as in the present exemplary embodiment, the distance between the protruded parts inevitably has the above-described relationship since the width of each of the protruded parts increases toward the port part 11.

Figure 8A:
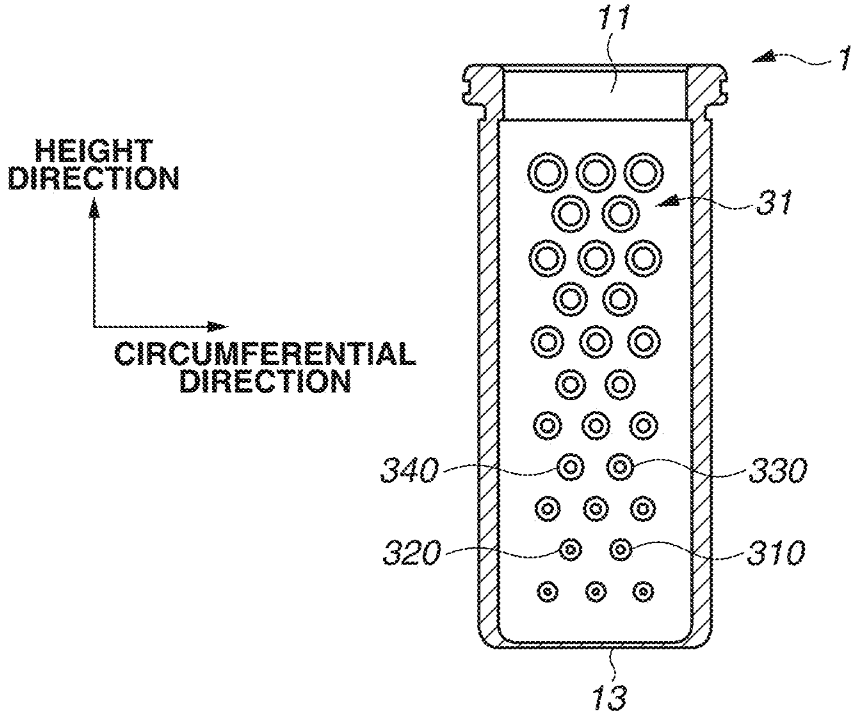
FIG. 8A is a schematic diagram illustrating a configuration in which the protruded parts of the depression-protrusion structure are arranged in a staggered pattern.
Figure 8B:
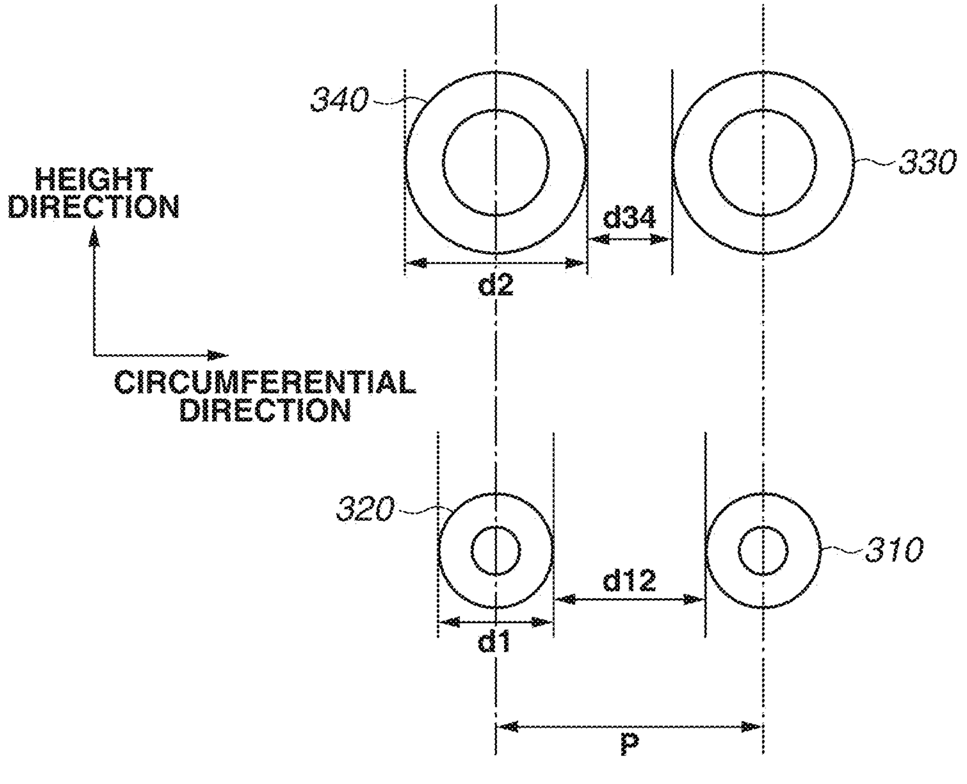
FIG. 8B is an enlarged view of first to fourth protruded parts that are some of the protruded parts illustrated in FIG. 8A.

FIG. 8A is a schematic diagram illustrating a configuration in which the protruded parts of the depression-protrusion structure 31 are arranged in a staggered pattern. In FIG. 8A, only some of the protruded parts are illustrated; however, the plurality of protruded parts arranged in a similar manner is desirably formed over the entire inner peripheral surface of the barrel part 12 of the container 1. FIG. 8B is an enlarged view of the first protruded part 310 to a fourth protruded part 340 that are some of the protruded parts illustrated in FIG. 8A. For a purpose of description of the distance between the protruded parts, the protruded parts are illustrated to be aligned in the height direction, instead of being in the staggered arrangement.

In the exemplary embodiment illustrated in FIGS. 8A and 8B, the width d2 in the circumferential direction of each of the third protruded part 330 and the fourth protruded part 340 provided on the port part 11 side is greater than the width d1 in the circumferential direction of each of the first protruded part 310 and the second protruded part 320 provided on the bottom part 13 side. In other words, the width d2 in the direction intersecting the height direction of the protruded part at a certain position in the height direction is greater than the width d1 in the direction intersecting the height direction of the protruded part at a position on the bottom part side relative to the certain position in the height direction. Further, as illustrated in FIG. 8B, the distance d34 between the third protruded part 330 and the fourth protruded part 340 is less than the distance d12 between the first protruded part 310 and the second protruded part 320. Each of the distances d34 and d12 is not the pitch P of the protruded parts but the shortest distance between the protruded parts. In the exemplary embodiment illustrated in FIGS. 7A and 7B and FIGS. 8A and 8B, the pitch P in the circumferential direction at a certain position in the height direction and the pitch P in the circumferential direction at a position different from the certain position in the height direction are desirably equal to each other.

By increasing the width of each of the protruded parts from the bottom part 13 toward the port part 11 as illustrated in FIGS. 7A and 7B and FIGS. 8A and 8B, a flow velocity of the liquid is increased between the protruded parts when the user tilts the container 1 to discharge the contents through the port part 11. Thus, it is possible to efficiently discharge the liquid. This is because the flow velocity of the liquid or the like is expressed by a quotient obtained by dividing a flow rate by a cross-sectional area of a flow path, and therefore, the flow velocity can be increased by reducing the cross-sectional area of the flow path near the port part 11.

In FIGS. 7A and 7B and FIGS. 8A and 8B, the example in which the protruded parts are provided on the base surface is described; however, the depressed parts may be provided on the base surface. In other words, the plurality of depressed parts in a stripe pattern extending in the height direction may be arranged side by side in the circumferential direction, or the plurality of depressed parts separate from one another may be two-dimensionally arranged. In this case, the width in the direction intersecting the height direction of the depressed part at a certain position in the height direction is desirably less than the width in the direction intersecting the height direction of the depressed part at a position on the bottom side relative to the certain position in the height direction.

In FIGS. 7A and 7B and FIGS. 8A and 8B, the example of the container from which the contents such as liquid is taken out through the port part 11 is described. In a case of a container from which the contents such as liquid is taken out through the bottom part 13, the widths of the protruded parts or the depressed parts may desirably be in an inverted relationship. Examples of such a container includes a pump-type container from which a user sucks the contents out from the bottom part thereof by using a tube. In a case where the protruded parts are provided on the base surface in the container from which the contents are taken out from the bottom part side, the width in the direction intersecting the height direction of the protruded part at a certain position in the height direction is desirably less than the width in the direction intersecting the height direction of the protruded part at a position on the bottom part side relative to the certain position in the height direction. Further, in a case where the depressed parts are provided on the base surface in the container from which the contents are taken out from the bottom part side, the width in the direction intersecting the height direction of the depressed part at a certain position in the height direction is desirably greater than the width in the direction intersecting the height direction of the depressed part at a position on the bottom part side relative to the certain position in the height direction. Such a configuration facilitates the flow of the liquid or the like toward the bottom part 13 in the container 1, which makes it possible to realize the container from which the contents such as liquid can be easily taken out.

In the exemplary embodiment and application thereof illustrated in FIGS. 7A and 7B and FIGS. 8A and 8B, the examples in which the widths in the direction intersecting the height direction of the protruded parts or the depressed parts are varied in the height direction are described. In these examples, as the height of each of the protruded parts, the depth of each of the depressed parts, the shape of each of the protruded parts or the depressed parts, and the pitch of the protruded parts or the depressed parts, the numerical value ranges described with reference to FIGS. 1A and 1B to FIG. 6 are directly applied as preferred numerical value ranges. The widths of the protruded parts or the depressed parts are varied in the height direction so as to fall within the numerical value ranges described with reference to FIGS. 1A and 1B to FIG. 6.

In the present exemplary embodiment, the container from which the contents such as liquid are easily taken out is described. In a case where the container according to the present exemplary embodiment is used as a container housing liquid such as a chemical solution, more remarkable effects are expected. If residual liquid is present in the container for the chemical solution or the like in a case where the same chemical liquid is measured and put in the container, a difference from a desired amount of contents occurs. Further, in a case where a different chemical solution is put in the container, the chemical solution is mixed with the residual solution. In the present exemplary embodiment, the contents can be discharged without leaving the contents. This makes it possible to reduce such an issue.

Figure 9A:
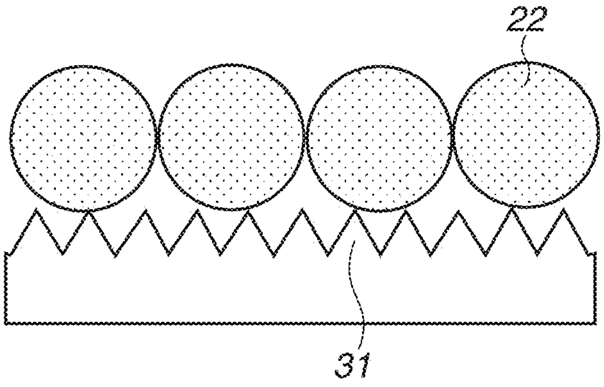
FIG. 9A is a cross-sectional view illustrating a contact state of toner and the depression-protrusion structure at a pitch according to the first exemplary embodiment.
Figure 9B:
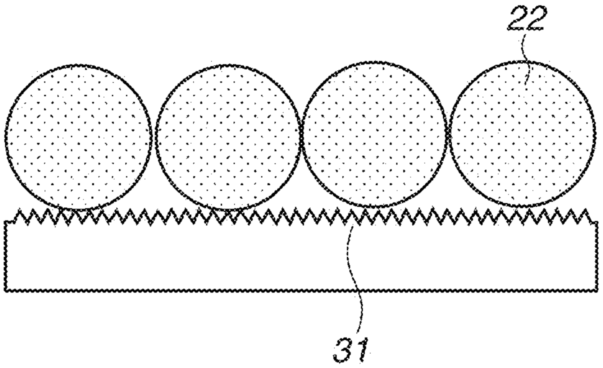
FIG. 9B is a cross-sectional view illustrating a contact state of the toner and the depression-protrusion structure at a pitch according to the first exemplary embodiment.
Figure 9C:
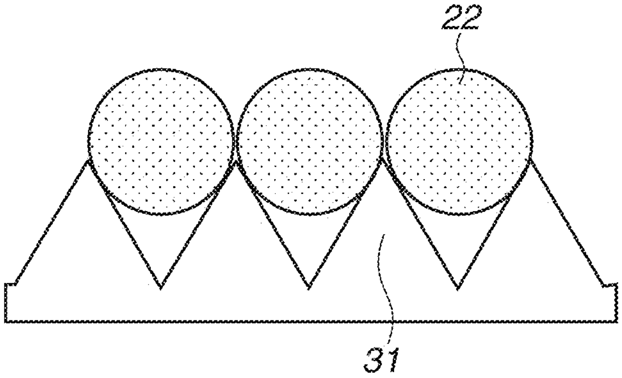
FIG. 9C is a cross-sectional view illustrating a contact state of the toner and the depression-protrusion structure at a pitch according to the first exemplary embodiment.
Figure 9D:
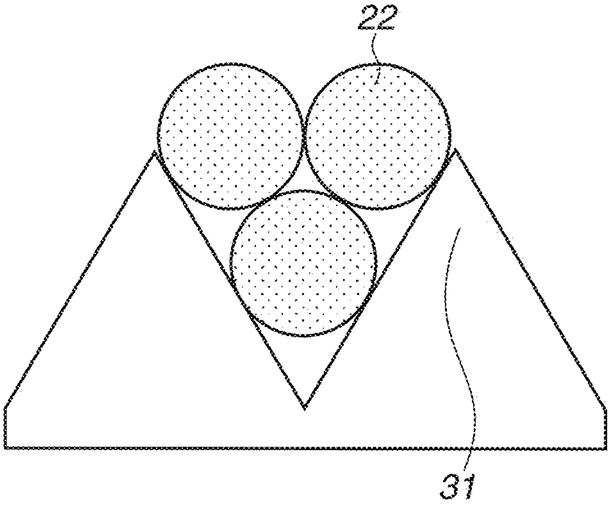
FIG. 9D is a cross-sectional view illustrating a contact state of the toner and the depression-protrusion structure at a pitch according to the first exemplary embodiment.

As the liquid or the like, water, the chemical solution, and the like are described above as examples; however, the container 1 may be a toner container housing powder such as toner. In this case, as illustrated in FIGS. 9A to 9D, powder 22 adheres to the surface of the depression-protrusion structure 31. FIGS. 9A to 9D illustrate depression-protrusion structures 31 having various heights and pitches. In a case where the container 1 is the toner container, the pitch of the depression-protrusion structure 31 is desirably 1 μm or more and 5 μm or less as illustrated in FIG. 9A. In a case where the pitch of the depression-protrusion structure 31 is less than 1 μm as illustrated in FIG. 9B, because the pitch is small, the number of contacts between the powder 22 and the depression-protrusion structure 31 is increased, and a sliding-down effect of the powder 22 is reduced. Further, when the pitch of the depression-protrusion structure 31 is more than 5 μm as illustrated in FIGS. 9C and 9D, the powder 22 having entered the depressed parts hardly exits the depression-protrusion structure 31, and the sliding-down effect of the powder 22 is reduced.

In a case where the depth of each of the depressed parts and the height of each of the protruded parts are shallower than the pitch of the protruded parts, the number of contacts between the powder 22 and the depression-protrusion structure 31 is increased. Therefore, the depth of each of the depressed parts and the height of each of the protruded parts are desirably greater than the pitch of the protruded parts.

When the width of each of the protruded parts is increased, a contact area between the powder 22 and the depression-protrusion structure 31 is increased. This reduces the sliding-down effect of the powder 22. Therefore, the width of each of the protruded parts is desirably ½ or less of the pitch.

Figure 10A:
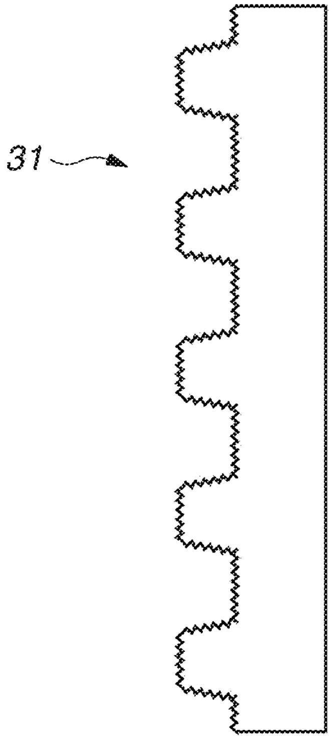
FIG. 10A is a schematic diagram illustrating the depression-protrusion structure of the container.
Figure 10B:
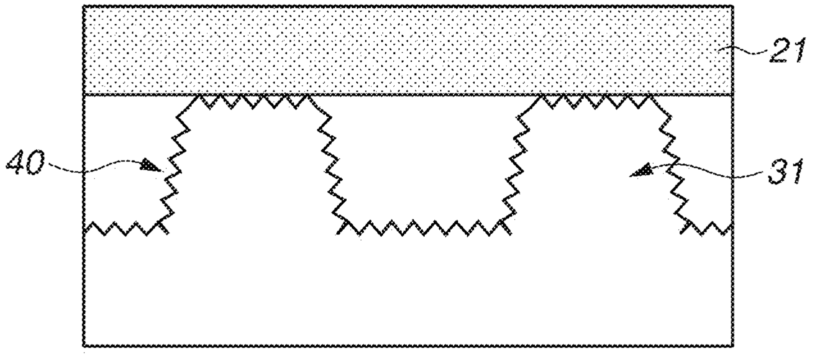
FIG. 10B is a schematic diagram illustrating a state where the depression-protrusion structure illustrated in FIG. 10A supports liquid.

In the above-described exemplary embodiment, a finer depression-protrusion structure may be provided on the surface of the depression-protrusion structure 31. Such an exemplary embodiment is described with reference to FIGS. 10A and 10B. FIG. 10A is a schematic diagram illustrating the depression-protrusion structure 31 of the container 1, and FIG. 10B is a schematic diagram illustrating a state where the depression-protrusion structure 31 illustrated in FIG. 10A supports the liquid 21. As illustrated in FIG. 10B, the surface of the depression-protrusion structure 31 may be formed as a rough surface in which a finer depression-protrusion structure 40 is provided. As a result, when the depression-protrusion structure 40 and the liquid 21 are in contact with each other, the water repellent effect described with reference to FIGS. 5A and 5B is also generated between the depression-protrusion structure 40 and the liquid 21, and ease of taking-out the contents and a reduction effect of the residual liquid are improved.

A height, a pitch, and a width of the depression-protrusion structure 40 are respectively about 1/100 of the height H, the pitch P, and the width D of the depression-protrusion structure 31, and are each desirably 0.01 μm or more and less than 1 μm.

A method of manufacturing the container 1 according to the present exemplary embodiment is described with reference to FIGS. 11A to 11D. FIG. 11A is a diagram illustrating an injection process. A cavity 50 surrounded by a core mold 56 and a cavity mold 57 is formed, and a resin is injected from an injection unit 61 to fabricate a preform 2 illustrated in FIG. 11B. A contact surface 56*b* of the core mold 56 coming into contact with the preform 2 has a depression-protrusion structure 41. The depression-protrusion structure 41 is transferred to a molded product, and the depression-protrusion structure 31 is formed on the container 1 (see FIG. 11D). The depression-protrusion structure 41 may be protruded parts formed on a base surface or depressed parts formed on the base surface. FIG. 11B illustrates a state where the preform 2, made of the resin, fabricated in FIG. 11A is taken out from the cavity mold 57. At this time, the core mold 56 is not taken out yet. The depression-protrusion structure 41 provided on the contact surface 56*b* of the core mold 56 has a shape obtained by inverting the depression-protrusion structure of the container to be manufactured. Therefore, the width in the direction intersecting the height direction of each of the protruded parts or the depressed parts of the depression-protrusion structure 41 is similar to the width of each of the depressed parts or the protruded parts of the container described above.

Figure 11C:
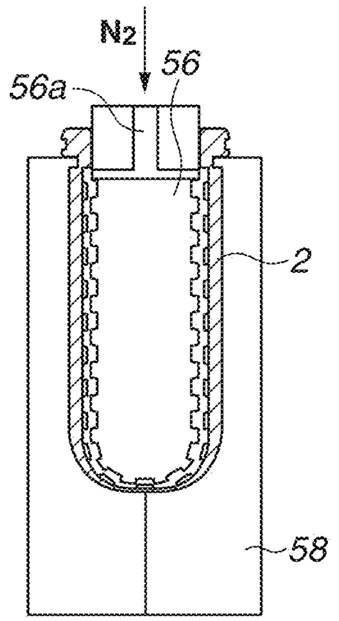
FIG. 11C is a schematic diagram illustrating the method of manufacturing the container.
Figure 11A:
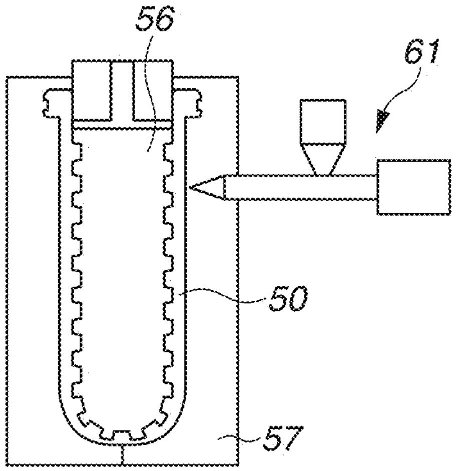
FIG. 11A is a schematic diagram illustrating a method of manufacturing the container.
Figure 11D:
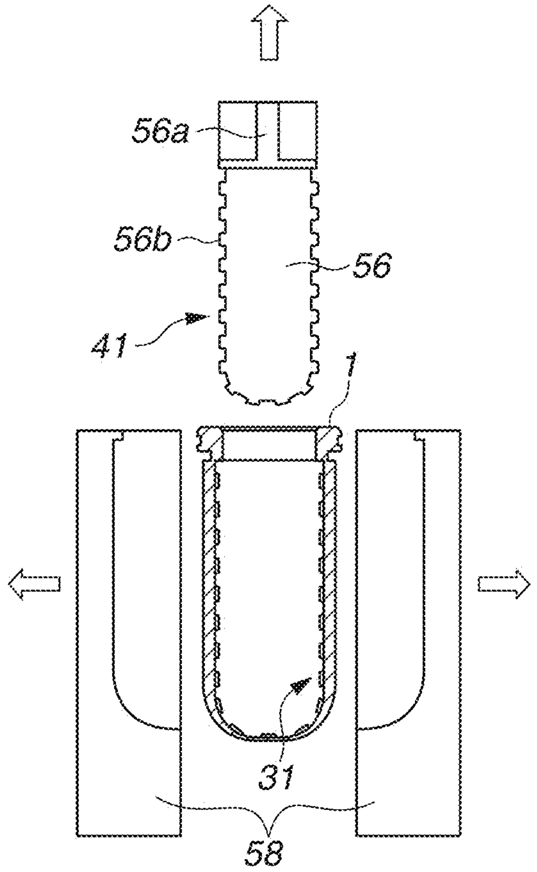
FIG. 11D is a schematic diagram illustrating the method of manufacturing the container.
Figure 11B:
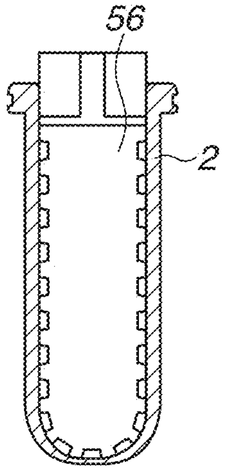
FIG. 11B is a schematic diagram illustrating the method of manufacturing the container.

FIG. 11C is a diagram illustrating a blowing process. The preform 2 fabricated in FIG. 11B is mounted on a mold 58 larger than the cavity mold 57, and pressurized gas ($N_2$) is injected from a flow path 56*a* provided in the core mold 56. As a result, the preform 2 is expanded toward the mold 58, and the core mold 56 and the preform 2 are separated from each other. At this time, a width of a port part of the preform 2 is not expanded, and only a barrel part of the preform 2 is expanded toward the mold 58. Then, the core mold 56 and the mold 58 are separated as illustrated in FIG. 11D, thereby the container 1 is demolded.

Figure 12A:
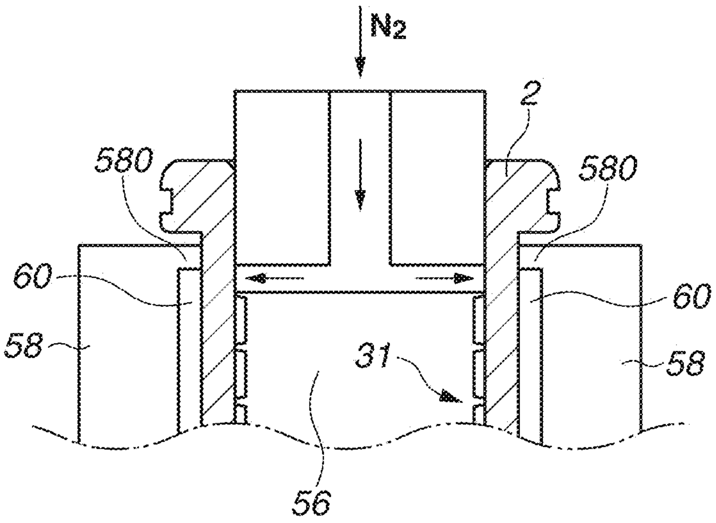
FIG. 12A is a diagram illustrating a preform mounted on a mold before a blowing process.
Figure 12B:
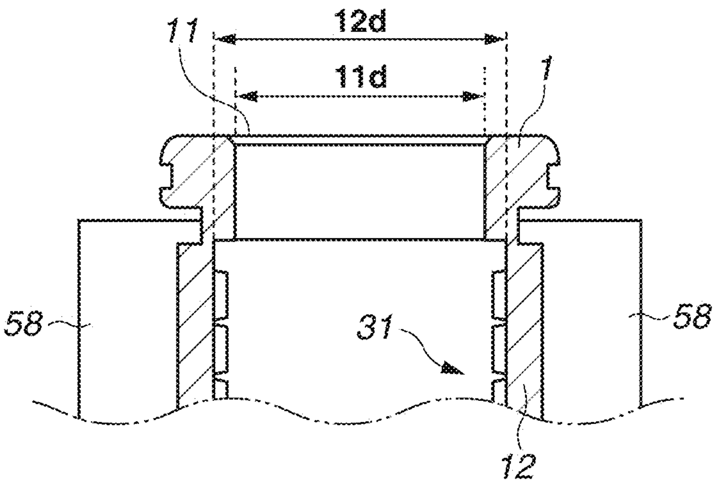
FIG. 12B is a diagram illustrating the container after the blowing process.

Change of the container 1 before and after the blowing process is described with reference to FIGS. 12A and 12B. FIG. 12A is a diagram illustrating the preform 2 mounted on the mold 58 before the blowing process, and FIG. 12B is a diagram illustrating the container 1 after the blowing process. Before the blowing process, since the mold 58 is larger than the cavity mold 57, a gap 60 is formed between the preform 2 and the mold 58. After the preform 2 is mounted on the mold 58, the pressurized gas is injected. At this time, the core mold 56 and the preform 2 are still in contact with each other.

When the pressurized gas is injected, the barrel part 12 of the container 1 is expanded by the gap 60. When the core mold 56 is separated from the container 1 after the barrel part 12 is expanded, the core mold 56 can be separated without shaving the depression-protrusion structure 31 formed on the container 1. The width 12*d* of the barrel part 12 is expanded by the blowing process and becomes greater than the width 11*d* of the port part 11. The width 12*d* of the barrel part 12 is desirably 1.005 times or more the width 11*d* of the port part 11, and is desirably 1.05 times or less the width 11*d* of the port part 11.

In FIGS. 12A and 12B, a stopper 580 that fixes the port part of the preform 2 is provided on the mold 58. When the stopper 580 is provided, the port part of the preform 2 is not expanded by injection of the pressurized gas, and only the barrel part of the preform 2 is expanded. If the stopper 580 is not provided, the port part of the preform 2 is also expanded in a manner similar to the barrel part of the preform 2, and the pressurized gas escapes from an expanded part of the port part. Thus, shape accuracy of the container 1 as a molded product may become inconsistent. Therefore, the container 1 has the shape in which the width 12*d* of the barrel part 12 is greater than the width 11*d* of the port part 11.

Figure 13:
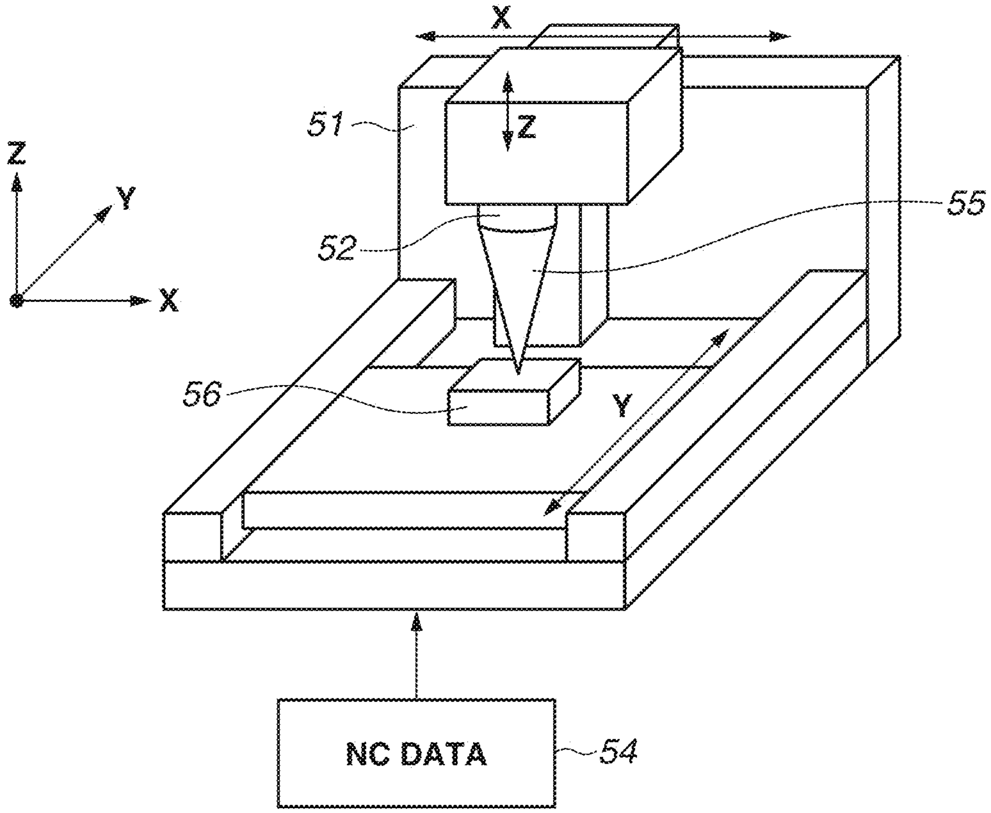
FIG. 13 is a diagram illustrating a configuration example of a laser processing machine.

A method of manufacturing the core mold 56 is described with reference to FIG. 13 and FIG. 14. FIG. 13 illustrates a configuration example of a laser processing machine as an apparatus performing processing of the core mold 56. In this example, a laser processing machine 51 is configured such that a laser head 52 is movable in three axes of a linear axis X, a linear axis Y, and a linear axis Z. A galvanometer mirror (not illustrated) is incorporated in the laser head 52. Depending on the laser processing machine, the laser head 52 is movable in more directions, and such a laser processing machine may be used. The laser head 52 is moved by a driving unit (not illustrated) based on a moving amount in each of the axes described in NC data 54. The laser head 52 emits a laser beam 55 based on the NC data 54, and scans the core mold 56 with the laser beam 55 by using the galvanometer mirror. In this manner, the core mold 56 can be processed into a desirable shape by the laser head 52.

Figure 14:
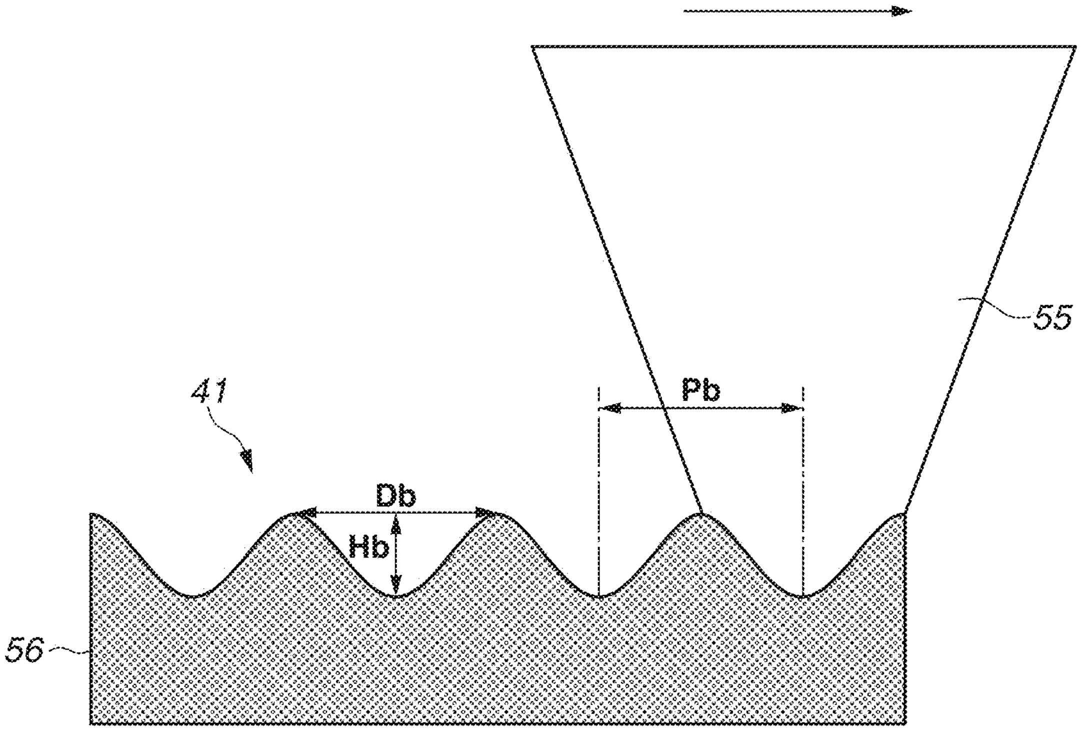
FIG. 14 is a diagram illustrating a state where a surface of a core mold is processed with a laser beam.

FIG. 14 is a diagram illustrating a state where a surface of the core mold 56 is processed with the laser beam 55. FIG. 14 illustrates the surface of the core mold 56 as viewed from a cross-sectional direction. The core mold 56 can have various forms such as a flat surface and a complicated curved surface corresponding to a shape of a molded product. Therefore, the base surface viewed from the cross-sectional direction is not limited to a linear surface, but FIG.

14 illustrates a case where the base surface is a linear surface as an example. The laser beam 55 is emitted from the laser head 52 to form the depression-protrusion structure 41 per pulse. As the laser beam, for example, infrared light having a wavelength of 1064 nm and a pulse width within a femtosecond range can be used, but other laser beams may be used.

As illustrated in FIG. 14, the core mold 56 is irradiated with the laser beam 55 while the laser beam 55 is repeatedly moved by the galvanometer mirror by a pitch Pb of the depression-protrusion structure 41 to be formed, thereby the depression-protrusion structure 41 is formed. Since the depression-protrusion structure 41 corresponds to the depression-protrusion structure 31, a depth Hb is equal to the height H, a width Db is equal to the width D, and the pitch Pb is equal to the pitch P. The height H, the width D, and the pitch P are described with reference to FIG. 1B. While FIG. 1B illustrates a cross-section in the height direction, the depression-protrusion structure in the direction intersecting the height direction is similarly formed.

Figure 15:
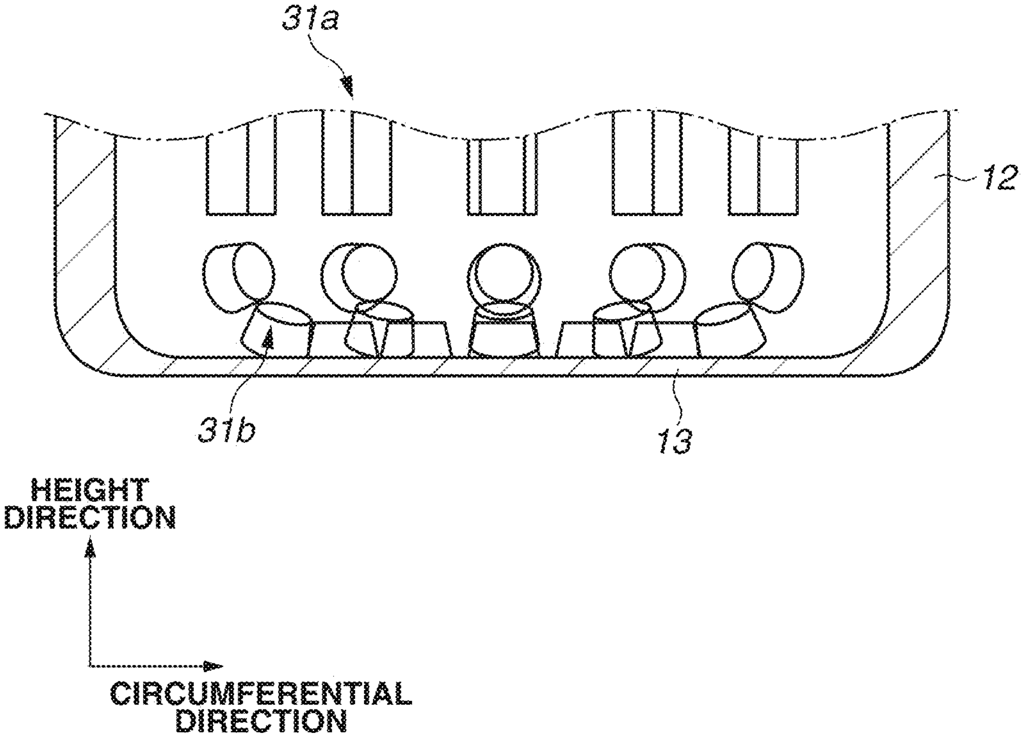
FIG. 15 is a diagram illustrating a bottom part of a container according to a second exemplary embodiment.

A bottom part 13 of a container 1 according to a second exemplary embodiment is described with reference to FIG. 15. FIG. 15 is an enlarged view of the bottom part 13. The container 1 according to the present exemplary embodiment is different from the container 1 according to the first exemplary embodiment in that the container 1 according to the present exemplary embodiment includes a depression-protrusion structure 31*a* arranged in a stripe pattern on the barrel part 12, and a depression-protrusion structure 31*b* arranged in a staggered pattern on the bottom part 13.

In the present exemplary embodiment, since the depression-protrusion structure 31*b* is provided also on the bottom part 13, water repellency is improved. As a result, the residual liquid hardly remains on the bottom part 13, and thus the configuration is suitable for, for example, a pump-type container from which the liquid or the like are sucked from the bottom part by using a tube. Since the depression-protrusion structure 31*a* provided on the barrel part 12 is arranged in a stripe pattern, the liquid or the like easily flows. With regard to the depression-protrusion structure 31*a* provided on the barrel part 12, the widths of the protruded parts or the depressed parts may be varied in the height direction as described with reference to FIGS. 7A and 7B.

Figure 16:
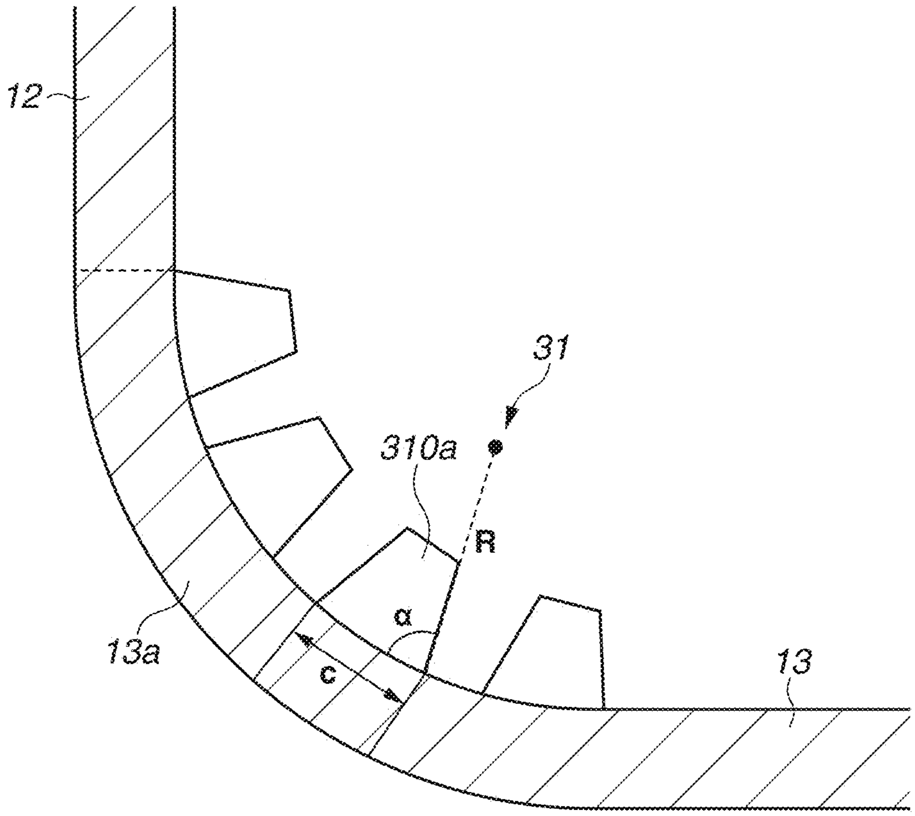
FIG. 16 is an enlarged view of a depression-protrusion structure provided on the bottom part including a curved portion.

FIG. 16 is an enlarged view of the depression-protrusion structure 31 provided on the bottom part 13 including a curved portion. The depression-protrusion structure 31 is provided not only on the barrel part 12 and the flat bottom part 13 but also on a bottom part 13*a* formed of a curved portion. This makes it possible to further improve water repellency. Protruded parts 310*a* on the bottom part 13*a* are also required to be demoldable. In the case illustrated in FIG. 16, a width c of a lower base of each of the protruded parts 310*a* is desirably greater than a width of an upper base. An elevation angle $\alpha$ of each of the protruded parts 310*a* is desirably expressed by the following inequality using the width c of the lower base and a radius of curvature R, $\alpha<\tan^{-1}(\sqrt{(4R^2-c^2)}/c)$.

As a result, it is possible to reduce damage and shavings in a process of demolding the container 1.

Figure 17:
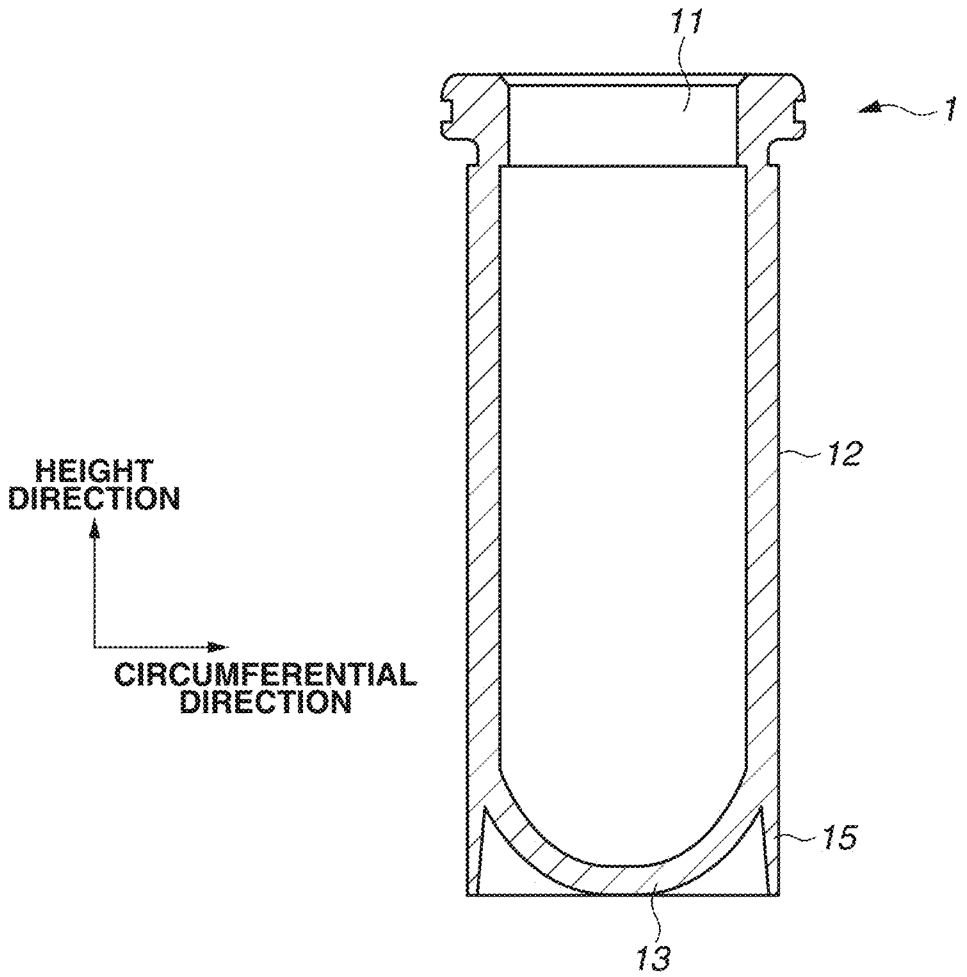
FIG. 17 is a diagram illustrating an example of a round-bottom container.

The container 1 is not limited to a flat-bottom container as illustrated in FIG. 1A, and may be a round-bottom container as illustrated in FIG. 17. In a case of the round-bottom container, the bottom part 13 is formed of a curved portion. Thus, the depression-protrusion structure provided on the bottom part 13 includes the protruded parts as described with reference to FIG. 16. In the case of the round-bottom container, it is difficult for the container 1 to stand on its own. Therefore, leg parts 15 may be provided to enable the container 1 to stand on its own.

The exemplary embodiments described above can be appropriately changed without departing from the technical idea. For example, the plurality of exemplary embodiments can be combined. In addition, some matters according to at least one exemplary embodiment can be deleted or replaced.

Further, matters can be newly added to at least one exemplary embodiment. The disclosed contents in the present specification include not only the matters explicitly described in the present specification, but also all matters understandable from the present specification and the drawings attached to the present specification.

The disclosed contents in the present specification include a complementary set of individual concepts described in the present specification. More specifically, for example, when there is a description that "A is greater than B" in the present specification, the present specification discloses that "A is not greater than B" even when a description that "A is not greater than B" is omitted. This is because, in a case where there is the description that "A is greater than B", a case where "A is not greater than B" is taken into consideration as a premise.

The present invention is not limited to the above-described exemplary embodiments, and can be variously changed and modified without departing from the spirit and the scope of the present invention. Therefore, the following claims are attached in order to make public the scope of the present invention.

According to the present invention, the liquid or the like can be easily taken out of the container.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A container comprising:

a port part;

a barrel part continuous with the port part;

a bottom part provided on a side opposite to the port part via the barrel part; and a depression-protrusion structure configured to develop a lotus effect on at least an inner surface of the barrel part, wherein, when a direction passing through the port part and the bottom part is defined as a height direction, a width in a direction intersecting the height direction of a protruded part of the depression-protrusion structure at a certain position in the height direction is greater than a width in the direction intersecting the height direction of the protruded part of the depression-protrusion structure at a position on a bottom part side relative to the certain position in the height direction, or a width in the direction intersecting the height direction of a depressed part of the depression-protrusion structure at a certain position in the height direction is less than a width in the direction intersecting the height direction of the depressed part of the depression-protrusion structure at a position on the bottom part side relative to the certain position in the height direction.

2. The container according to claim 1, wherein protruded parts or depressed parts are configured in a stripe pattern extending in the height direction.

3. The container according to claim 2, wherein a pitch in the direction intersecting the height direction of the protruded parts at the certain position is equal to a pitch in the direction intersecting the height direction of the protruded parts at a position on the bottom part side relative to the certain position in the height direction, or a pitch in the direction intersecting the height direction of the depressed parts at the certain position is equal to a pitch in the direction intersecting the height direction of the depressed parts at the position on the bottom part side relative to the certain position in the height direction.

4. The container according to claim 3, wherein the pitch of the protruded parts or the pitch of the depressed parts is 1 μm or more and 100 μm or less.

5. The container according to claim 1, wherein the depression-protrusion structure is configured to include a plurality of protruded parts or depressed parts separate from one another arranged two-dimensionally.

6. The container according to claim 5, wherein a pitch in the direction intersecting the height direction of the protruded parts at the certain position is equal to a pitch in the direction intersecting the height direction of the protruded parts at a position on the bottom part side relative to the certain position in the height direction, or a pitch in the direction intersecting the height direction of the depressed parts at the certain position is equal to a pitch in the direction intersecting the height direction of the depressed parts at the position on the bottom part side relative to the certain position in the height direction.

7. The container according to claim 6, wherein the pitch of the protruded parts or the pitch of the depressed parts is 1 μm or more and 100 μm or less.

8. The container according to claim 1, wherein a height of each of the protruded parts or a depth of each of the depressed parts is 1 μm or more and less than 100 μm.

9. The container according to claim 1, wherein the protruded parts or the depressed parts are configured in a stripe pattern extending in the height direction on the barrel part, and wherein the bottom part includes a depression-protrusion structure configured to include a plurality of protruded parts or depressed parts separate from one another arranged two-dimensionally.

10. The container according to claim 1, wherein the width of the protruded part or the width of the depressed part is 1 μm or more and 80 μm or less.

11. The container according to claim 1, wherein the container is configured to house liquid or powder.

12. A container comprising:

a port part;

a barrel part continuous with the port part;

a bottom part provided on a side opposite to the port part via the barrel part; and a depression-protrusion structure configured to develop a lotus effect on inner surfaces of the barrel part and the bottom part, wherein, when a direction passing through the port part and the bottom part is defined as a height direction, the depression-protrusion structure of the barrel part is configured to include, in a direction intersecting the height direction, a plurality of protruded parts or depressed parts arranged in a stripe pattern extending in the height direction, and the depression-protrusion structure of the bottom part is configured to include a plurality of protruded parts or depressed parts separate from one another arranged two-dimensionally.

13. The container according to claim 12, wherein a width in a direction intersecting the height direction of a protruded part of the depression-protrusion structure of the barrel part at a certain position in the height direction is less than a width in the direction intersecting the height direction of the protruded part of the depression-protrusion structure of the barrel part at a position on a bottom part side relative to the certain position in the height direction, or a width in the direction intersecting the height direction of a depressed part of the depression-protrusion structure of the barrel part at a certain position in the height direction is greater than a width in the direction intersecting the height direction of the depressed part of the depression-protrusion structure of the barrel part at a position on the bottom part side relative to the certain position in the height direction.

14. The container according to claim 12, wherein a width of a protruded part at a position on a port part side relative to a bottom part side of the depression-protrusion structure of the barrel part is different from a width of the protruded part at a position on the bottom part side relative to the port part side of the depression-protrusion structure of the barrel part, or a width of a depressed part at a position on the port part side relative to the bottom part side of the depression-protrusion structure of the barrel part is different from a width of the depressed part at a position on the bottom part side relative to the port part side of the depression-protrusion structure of the barrel part.

15. The container according to claim 14, wherein, when a direction passing through the port part and the bottom part is defined as a height direction, the width of the protruded part and the width of the depressed part are widths in a direction intersecting the height direction.

16. The container according to claim 12, wherein the depression-protrusion structure of the barrel part is formed integrally with the container.

17. The container according to claim 12, wherein a surface of the depression-protrusion structure of the barrel part is a rough surface having a roughness of 0.01 μm or more and less than 1 μm.

18. The container according to claim 12, wherein the depression-protrusion structure of the barrel part is not formed on the port part.

19. The container according to claim 12, wherein the container is made of a material containing a resin.

20. The container according to claim 12, wherein a width of the barrel part is 1.005 times or more a width of the port part and is 1.05 times or less the width of the port part.

21. The container according to claim 12, wherein the container is configured to house liquid or powder.

* * * * *